US012634378B2

(12) United States Patent
Roter

(10) Patent No.: US 12,634,378 B2
(45) Date of Patent: May 19, 2026

(54) DEVICE AND METHOD FOR TRANSMISSION IN PUSH MODE, AND ASSOCIATED COMPUTER PROGRAM PRODUCT

(71) Applicant: SAGEMCOM ENERGY & TELECOM SAS, Rueil Malmaison (FR)

(72) Inventor: Ziv Roter, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 18/477,310

(22) Filed: Sep. 28, 2023

(65) Prior Publication Data

US 2024/0106914 A1      Mar. 28, 2024

(30) Foreign Application Priority Data

Sep. 28, 2022    (FR) ...................................... 2209834

(51) Int. Cl.
H04L 67/55 (2022.01)
H04L 9/00 (2022.01)

(52) U.S. Cl.
CPC .................................. H04L 67/55 (2022.05)

(58) Field of Classification Search
CPC ................ H04L 67/55; H04Q 2209/60; H04Q 2209/826; H04Q 9/00
See application file for complete search history.

(56) References Cited

FOREIGN PATENT DOCUMENTS

| EP | 3945725 | A1 | | 2/2022 | |
| EP | 4346227 | B1 | | 6/2025 | |
| FR | 3100095 | A1 | * | 2/2021 | ............. H04L 67/12 |

OTHER PUBLICATIONS

Foreign Communication from a Related Counterpart Application, European Search Report dated Feb. 26, 2024, European Application No. 23306605 filed on Sep. 27, 2023.
Foreign Communication from a Related Counterpart Application, European Intention to Grant dated Feb. 3, 2025, European Application No. 23306605 filed on Sep. 27, 2023.

(Continued)

*Primary Examiner* — Kamal M Hossain
(74) *Attorney, Agent, or Firm* — Conley Rose, P.C.

(57)          ABSTRACT

A method is described for transmission in push mode, implemented by a transmitting device comprising a memory comprising software code and a processor which, when executing the software code, causes the device to implement the method comprising:

(a) triggering a transmission, to a receiving device, of values of an attribute adapted to contain ordered data, whose values constitute all or a subset, a transmission containing at most the values of a single selection interval of the ordered data;

(b) verifying that the attribute has no value to be transmitted for all among the N adjacent data selection intervals from a selection starting point in the order of the data to the end of the interval preceding the interval comprising a current data collection period, with N being an integer;

(c) if the verification is positive, transmitting a single message indicative of the absence of values for the N intervals.

14 Claims, 3 Drawing Sheets

(56)          References Cited

OTHER PUBLICATIONS

Foreign Communication from a Related Counterpart Application, France Search Report and Written Opinion dated Apr. 11, 2023, France Application No. 2209834 filed on Sep. 28, 2022.
COSEM Interface Classes, "Comprehensive Semantic Model for Energy Management" Technical Report, DLMS User Association, Dec. 21, 2021, DLMS UA 1000-1 Part 2 Ed 15.

* cited by examiner

DEVICE AND METHOD FOR TRANSMISSION IN PUSH MODE, AND ASSOCIATED COMPUTER PROGRAM PRODUCT

CROSS-REFERENCE TO RELATED APPLICATIONS

The present application claims priority to French Application No. 2209834 filed with the Intellectual Property Office of France on Sep. 28, 2022 and entitled "DEVICE AND METHOD FOR TRANSMISSION IN PUSH MODE, AND ASSOCIATED COMPUTER PROGRAM PRODUCT," which is incorporated herein by reference in its entirety for all purposes.

TECHNICAL FIELD

The invention relates to a method for transmitting data in push mode, a device for implementing the method and an associated computer program product, which can be used, in a non-limiting manner, in the context of a repeatedly collected data transmission.

TECHNICAL BACKGROUND

In numerous applications, devices accumulate data periodically or non-periodically, requiring a collection, by a receiving client device, of data accumulated by a producing server device. This is for example the case of meters of various types, such as electricity, gas, water or thermal energy meters. The quantity of data produced by such devices during a given time interval is not always predictable. A device can generate periodic data, for example a value measured by the meter at a given instant and recorded once per period. However, in the event of data generation problems, periods without data may exist. The devices can also generate aperiodic data, for example in the form of an event log. In these cases, the amount of data is unpredictable by nature. There is a need for an effective transmission method taking into account these aspects.

SUMMARY

One or more embodiments relate to a method for transmission in push mode, implemented by a transmitting device comprising a memory comprising software code and a processor which, when executing the software code, causes the device to implement the method, the method comprising:

(a) triggering a transmission, to a receiving device, of values of an attribute adapted to contain ordered data whose values constitute all or a subset, a transmission containing at most the values of a single selection interval of the ordered data;

(b) verifying that the attribute has no value to be transmitted for all among the N adjacent data selection intervals from a selection starting point in the order of the data to the end of the interval preceding the interval comprising a current data collection period, with N being an integer;

(c) if the verification is positive, transmitting a single message indicative of the absence of values for the N intervals.

According to one or more embodiments, the transmission of at most one message in push mode in the event of positive verification comprises, according to a second operating mode, the sending of no messages for the N intervals.

According to one or more embodiments, if the verification is negative, the transmission in push mode, to the receiving device, of a message comprising the values of the first interval that is not empty of values to be transmitted, no message being transmitted for the intervals empty of values to be transmitted preceding said first interval.

According to one or more embodiments, the method comprises, following the transmission of the message comprising values, the reception of an acknowledgment from the receiving device and the updating of information identifying the last value acknowledged for the attribute.

According to one or more embodiments, the starting point in the order of the data is adjacent to the end of the interval comprising the most recent value acknowledged by the receiving device.

According to one or more embodiments, the starting point in the order of the data is counted from the most recent value acknowledged by the receiving device.

According to one or more embodiments, the verification step is preceded by a step of filtering the data of the attribute according to one or more criteria in order to determine said values to be transmitted.

According to one or more embodiments, the method comprises:

verifying whether other attributes are to be processed;

in the affirmative, step (b) is carried out for each other attribute to be processed, the verification for step (c) being considered positive in case of absence of values to transmit for all attributes processed.

According to one or more embodiments, the single message indicative of the absence of values for the N intervals comprises an empty table.

According to one or more embodiments, N is greater than or equal to two.

According to one or more embodiments, the data are ordered from the oldest item of data to the most recent item of data.

According to one or more embodiments, the data comprise a timestamp, the order being a function of the timestamp.

According to one or more embodiments, the selection interval is either an interval defined by a number of values or an interval defined by a duration.

According to one or more embodiments, a time interval comprises one or more data collection periods, corresponding to a data selection depth.

One or more embodiments relate to a storage medium readable by a device provided with a processor, said medium comprising instructions which, when the program is executed by a processor of a device, cause the device to carry out at least one of the described methods.

One or more embodiments relate to a communication device comprising a processor and a memory comprising software code, wherein the processor, when executing the software code, causes the communication device to carry out the method according to one of claims 1 to 12.

BRIEF DESCRIPTION OF THE FIGURES

Further features and advantages will become apparent from the following detailed description, which may be understood with reference to the attached drawings in which.

DETAILED DESCRIPTION

In the following description, identical, similar or analogous elements will be referred to by the same reference numbers.

The block diagrams, flowcharts and message sequence diagrams in the figures illustrate the architecture, functionalities and operation of systems, devices, methods and computer program products according to one or more exemplary embodiments. Each block of a block diagram or each step of a flowchart may represent a module or a portion of software code comprising instructions for implementing one or more functions. According to certain implementations, the order of the blocks or the steps may be changed, or else the corresponding functions may be implemented in parallel. The method blocks or steps may be implemented using circuits, software or a combination of circuits and software, in a centralized or distributed manner, for all or part of the blocks or steps. The described systems, devices, processes and methods may be modified or subjected to additions and/or deletions while remaining within the scope of the present disclosure. For example, the components of a device or system may be integrated or separated. Likewise, the features disclosed may be implemented using more or fewer components or steps, or even with other components or by means of other steps. Any suitable data-processing system can be used for the implementation. An appropriate data-processing system or device comprises for example a combination of software code and circuits, such as a processor, controller or other circuit suitable for executing the software code. When the software code is executed, the processor or controller prompts the system or device to implement all or part of the functionalities of the blocks and/or steps of the processes or methods according to the exemplary embodiments. The software code can be stored in a memory or a readable medium accessible directly or via another module by the processor or controller.

Figure 1:
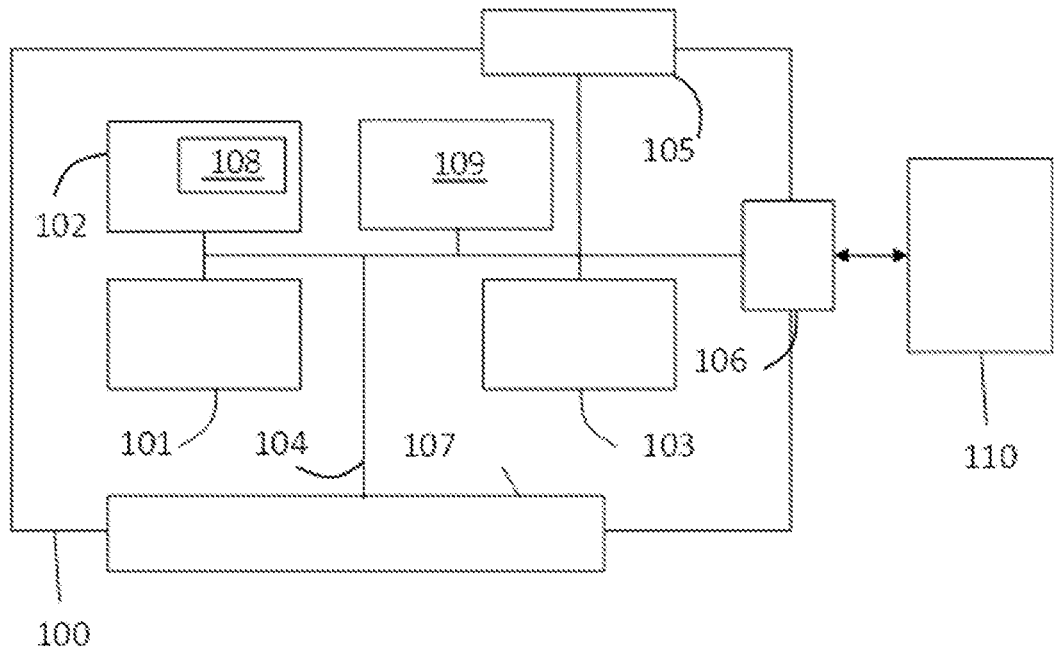
FIG. 1 is a block diagram of a system comprising a server device and a client device according to one or more embodiments.

FIG. 1 is a block diagram of a communication network comprising a device 100 and a device 110 able to communicate through the network in a bidirectional manner. The device 100 is a device that stores accumulated data or itself accumulates data, at least some of which are to be transmitted to the device 110. Hereafter, the device 100 will be called the "server" and the device 110 will be called the "client". For example, the server 100 is an electricity, water, gas, thermal energy, or other meter, while the client 110 is a device collecting data from different servers on behalf of the operator of the distribution network. The server 100 comprises a processor 101, a memory 102, a data source 103, a user interface 105, a communication interface 106 configured to communicate bi-directionally with the client 110, a display 107 suitable for displaying data to a user of the server 100, as well as a working memory 109. The various components of the server 100 are connected through a communication bus 104. The memory 102 comprises software code 108. The memory 109 is used to store and manage the data to be transmitted. When the processor executes the software code 108, it causes the server to implement a method according to one or more embodiments described and comprising the processing of gaps in the data to be transmitted as explained in more detail below. These data come for example from the data source 103. The data source

103 is for example the metrological unit of the meter itself which produces a value of the quantity being metered. The metrological unit is for example responsible for measuring and recording an absolute physical quantity (intensity of a current, gas pressure) or a cumulative one (electrical energy or volume of a gas that has passed through). The data can be obtained periodically or aperiodically or comprise a combination of data obtained periodically and aperiodically. The fact that data are generally obtained periodically does not exclude the absence of data during time intervals of varying length (powering off, faults, periods of rest or non-representative periods, etc.). The communication network is for example a radio medium of one of the types 2G/3G/4G/LTE NB-IoT/LTE Cat-M1/LoRA or other types.

DLMS, or "Device Language Message Specification", comprises a series of standards developed and held by the DLMS User Association ("DLMS UA") standardizing data exchanges for electricity meters or other meters. The DLMS UA in particular maintains the COSEM (Comprehensive Semantic Model for Energy Management) "Blue Book". In particular, the document "DLMS UA 1000-1", version 15, part 2, version 1.0 dated 21 Dec. 2021 describes elements used in pushing data from a server to a client and whereby the client indicates receipt of—or acknowledges—the data received. The document introduces a mechanism that makes it possible, upon each periodic triggering of the push transmission, to select a certain quantity of saved data to be pushed from the last acknowledged item of data. For example, it is possible to specify a time interval from the last acknowledged item of data (e.g. "Three full days after the last acknowledged item of data"). The various choices are described in table 9 of the cited DLMS UA document. This limits the amount of an individual transmission, in order to preserve the operation of the transport network and the client in charge of collecting and processing the data, and to not overload them in the event of an absence of prolonged communication and/or a large number of equipment.

According to one or more exemplary embodiments, the data accumulated by the server 100 in the memory 109 are at least partly time-logged, that is to say ordered in time. The term "ordered in time" is understood to mean, according to the chosen embodiment, that an item of time information is associated with an item of data and that the order of the data is determined by the item of time information, or simply that the data appear in the order it was obtained or saved. For example, the server 100 samples the metrological unit 103 at regular intervals and stores the value measured by this unit in its memory, this value being associated with the value of a clock identifying for example the moment of sampling or the period covered by the value. The period is for example identified by a clock value of the end of the period. Thus, for example, load curves are obtained over time. Other information can be associated with these two values.

A server may comprise a multitude of metrological units giving respective values for distinct quantities and thus associating a multitude of data with a single time value (see for example the two columns on the right of table 1 shown below). The data are stored in the memory for example in objects comprising one or more suitable attributes.

If the data generated periodically over a certain time interval is selected (for example, an integer multiple of a period such as a day), the quantity of data will always be the same. However, there are cases where the amount of data over a period may differ, for example:

when the server was powered off for a long time and the data generation process has not been executed;

following a forward time reset involving a significant time jump (for example, in the case where the server is put back in service and the power reserve powering the real time clock was depleted, or that its time had not been set).

When inputs are created aperiodically—such as is the case for event log inputs—the same problem arises.

Table 1 is an example of normally periodic data that can be produced by the actual meter 103 of the server 100. By way of example, a server can produce and store several thousand inputs that may cover, depending on frequency, for example several months of operation.

TABLE 1

| Timestamp Type: string of bytes encoding a date/time | Status Type: 8-bit unsigned integer taken as a status bits field | Imported power record Type: 32-bit unsigned integer | Exported power record Type: 32-bit unsigned integer |
|---|---|---|---|
| . . . | | | |
| 21 Jan. 2022 00:00:00 | 0 | 2370 | 0 |
| 21 Jan. 2022 01:00:00 | 0 | 2375 | 0 |
| 21 Jan. 2022 02:00:00 | 0 | 2375 | 0 |
| 21 Jan. 2022 03:00:00 | 0 | 2380 | 0 |
| 29 Jun. 2022 09:00:00 | 127 => bit PDN = 1 (indication that the meter was turned off in the period preceding the storage of this input) | 2385 | 0 |
| . . . | | | |

In table 1, an input is represented by a line and a structural element is represented by a column.

According to the example of the table, sampling is performed every hour and a normal day comprises twenty-four inputs. In the example, no input was stored between 22 Jan. 2021 and 22 Jun. 2029 because the meter was powered off. Selecting a time interval where the meter was out of service (e.g. a request from Jan. 2, 2022 to Jan. 3, 2022) will return a table of zero inputs.

Each time a transmission of pushed data is triggered, the server 100 evaluates the values associated with a list of attributes specified in an attribute configuring the push mechanism. The selected values will be concatenated in what is called a push buffer and encapsulated in a protocol data unit of the application layer suitable for transmission to the client.

In the context of DLMS, this data unit is termed "APDU Datallotification".

The content of the push buffer is obtained by extracting values of attributes in their entirety, or else partially. Partial extraction can be carried out by selecting—within the adapted attributes—the values to be sent by applying one or more filters, for example time criteria such as time intervals, input indexes or even structural elements.

The client produces a notice of receipt, also called an "acknowledgment" of the received data. The server thus knows the "last acknowledged input" for each of the attributes concerned. This makes it possible to select and send only the data not yet acknowledged, based on that input. The selection of the data is done for example by specifying a data depth, which may for example be defined by a time interval counted from the last acknowledged item of data, for example a number of periods ("3 full days of depth after the last acknowledged input"). According to certain embodiments, the depth is defined by a time interval counted from the preceding time interval which comprises the last acknowledged item of data. This limits the amount of data of an individual transmission, in order to preserve the operation of the transport network and the client in charge of processing the data, and not overload them.

For each attribute concerned, in the event of successful push transmission, that is, if the transmission is acknowledged by the client, the pointer of the last acknowledged item of data will be updated to place itself on the new last acknowledged item of data. In the event of failure, it will remain in the place before transmission and will be used as an original date for the new selection, which may include new data that was generated in the meantime. The oldest data are thus sent in priority.

A transmission is sent in the form of a table. A table is a data structure comprising timestamped inputs. An example of a structure of such a table is given by table 1. A transmission without data is indicated by an empty table, namely a table with zero inputs.

In the following examples, the data considered are time-stamped inputs filtered by selection relative to the last acknowledged item of data. For reasons of clarity and simplicity, the case of a single attribute whose data are to be transmitted is considered, and it is considered that in principle all the data recorded in an interval are to be transmitted.

A first example of operation is as follows:

A transmission in push mode is triggered daily. As a transmission only relates to complete days, the first transmission is sent on the second day, based on the previous days' data. The second day is still a period in progress. In the present case and at this stage of the method, there is only one preceding day, namely the first day (which is a day for which the data are complete on the second day).

The data selection spans a maximum of two full days after the last item of data acknowledged (and therefore with a maximum depth of two days). According to the present example, a day that it is incomplete because it is still in progress is not selected.

Day 2: 1 day of data to be sent (Day 1), successfully sent.

Day 3: 1 day of data to be sent (Day 2), failed to send.

Day 4: 2 days of data to be sent (Day 2, Day 3), failed to send.

Day 5: 3 days of data to be sent (Day 2, Day 3, Day 4) but selection limited to (Day 2, Day 3), successfully sent.

Day 6: 2 days of data to be sent (Day 4, Day 5), successfully sent.

Day 7: 1 day of data to be sent (Day 6), successfully sent. etc.

After each transmission acknowledgment, the pointer of the last acknowledged item of data is moved up by the server after it receives a notice of receipt from the client.

The maximum depth is chosen to limit the amount of data in a transmission in push mode to a reasonable size while making it possible to compensate for failures of previous transmissions.

A second example of operation is as follows. In this case, the time interval between the last data sent and the present time is long (several tens of periods, for example) and the data comprise time intervals where the generated data are empty.

A transmission in push mode is triggered daily.

The data selection spans a maximum depth of two days. It is assumed that the data on Day 1 are not empty (from Day 1 at 00:00 on Day 2 at 00:00), that after the server has been shut off for several tens of days, the Day 2 data and the following data are empty, and that the method of periodic transmission in push mode resumes on Day 50.

Day 50: sending Day 1 (up to Day 2 at 00:00 inclusive) and Day 2 (empty).

Day 51: sending Day 2 (D2 with 00:00 excluded, therefore Day 2 has no new acknowledged item of data) and Day 3 (no new acknowledged item of data).

Day 52: Day 2 (Day 2 with 00:00 excluded, therefore Day 2 has no new acknowledged item of data), Day 3 (no new acknowledged item of data).

etc.

In other words, a number of empty intervals at least equal to the data selection interval or depth will run empty transmissions in loops. Even if data appears on day 50 or afterward, that data will not be transmitted because the pointer to the last acknowledged item of data will not be able to advance.

One possible solution to this problem consists in advancing the pointer of the last item of data acknowledged after each transmission in push mode, up to the end of the interval considered. In the context of the second example above, for each transmission in push mode, the pointer would be advanced by two days. To return the pointer as close as possible to the present time involves numerous empty transmissions. If the selection interval has a depth of two days, the delay will not be caught up until the 98th day.

According to one or more embodiments, when a transmission in push mode of ordered data is envisaged, the server will determine whether or not there are data to be transmitted. This determination can be done in successive data selection intervals.

According to a first operating mode (referred to below as "mode 1"), the last empty interval of data to be transmitted before an interval covering a current data collection period will give rise to a transmission in push mode. This transmission may comprise information indicative of the absence of data to be transmitted, for example in the form of an empty table.

According to a second operating mode (referred to below as "mode 2"), if no item of data to be transmitted is determined, the transmission in push mode is not performed, but rather is cancelled.

In both cases, if an interval empty of data to be transmitted or a succession of such intervals are followed by an interval comprising data, then no transmission in push mode relating to the interval or the succession of intervals empty of data to be transmitted is carried out and a transmission in push mode is carried out for the non-empty interval.

It should be noted that data may have been recorded for an interval, but that none of these data are to be transmitted, for example based on one or more selection criteria. In this case, the interval is considered "empty". If data to be transmitted is determined, these data are also called "values" to be transmitted.

According to mode 1, the server analyzes the content of an interval located in the past. If there is no value selected for transmission within this interval, the method moves on to the next interval. The cursor over the beginning of the interval considered is, however, moved forward until the end of the selection interval previously considered.

The method is iterated until the end of the selection interval is no longer in the past (in other words, until this end is after the beginning of the time interval in progress, this time interval in progress being therefore incomplete), or until the selection interval contains values to be transmitted.

In the latter case, a transmission in push mode is carried out and the pointer on the last acknowledged input is moved forward relative to this transmission following a positive acknowledgment from the client.

Thus, the server skips the selection intervals empty of values to be transmitted, as these intervals do not give rise to a transmission in push mode.

In the case where no selection interval up to the present time includes data to be transmitted, a single transmission in push mode with an empty table is performed for all empty intervals. It should be noted that here an empty table is mentioned since this is the structure used for the transmission of data in the context of the present example, but according to other embodiments, the information indicating that no value to be transmitted has been determined may be encoded in some other way.

One advantage is that transmitting this information in push mode allows the server to inform the client that the server is still operational, but that no value to be transmitted is available.

According to one embodiment, in mode 1, when a multitude of attributes are analyzed and none comprises values to be transmitted, information indicative of the absence of values to be transmitted is transmitted for each of the attributes.

According to a second transmission in push mode, which is hereafter called "mode 2" and is otherwise similar to mode 1, in the case where no selection interval up to the present time comprises values to be transmitted, no transmission in push mode is performed.

One advantage in this case is that network bandwidth is saved. This may be appreciable in applications in which data generation is infrequent, as in the case of infrequent entries in event logs. Moreover, this mode is also suitable for servers operating on battery since it is more energy-efficient than mode 1.

One example of operation according to modes 1 or 2 based on the preceding examples is as follows:

A transmission in push mode is triggered daily.

The selection of values to be transmitted spans a maximum depth of two days.

The values to be transmitted begin on Day 1 which comprises data, but Days 2 to 100 are empty of data.

The method of periodic transmission in push mode begins on Day 50.

Day 50: Sending Day 1 and Day 2 (D1 is not empty).

Day 51: Days 3 and 4 are empty of values to be transmitted and nothing is sent.

Day 51: Days 5 and 6 are empty of values to be transmitted and nothing is sent.

etc.

Day 51: Days 47 and 48 are empty of values to be transmitted and nothing is sent.

Day 51: Days 49 and 50 are empty and either noting is sent (mode 2), or an empty table is sent (mode 1).

The transmission delay is thus caught up.

Catching up to the present, in the context of the example, is understood to mean that the end of the selection interval is at most at the end of the complete (or closed) period preceding the current period, which is thus incomplete and being likely to be increased by new data.

According to one or more embodiments, a third operating mode is defined, called "mode 0". According to this embodiment, the transmission of a message in push mode is always carried out following the triggering of a transmission—the absence or the presence of values to be transmitted does not influence the transmission.

According to one or more embodiments, the modes 0, 1 and 2 can be implemented by the same server. Means are then provided for selecting a mode. A transmission mode is chosen, for example automatically depending on the context (for example switching to mode 1 or 2 following resumption after a failure or shutdown, etc.) or by a user, through a user interface managed via the software code 109.

According to other embodiments, a server can implement only one of the two modes 1 or 2, or both.

If data follow a period during which no item of data is generated, modes 1 and 2 make it possible to not send an empty message—the first message sent will contain data. Furthermore, if no value to be transmitted is present after the last acknowledged value, the number of empty messages sent will be, according to the mode, zero or just one, which makes it possible to limit the bandwidth used.

Modes 1 and 2, when one of these modes is identified in the attribute, are only implemented for one or more attributes of objects comprising ordered data with a selection from the last acknowledged item of data. Values of other attributes of the push buffer are either transmitted according to the default mode, that is, mode 0, or not transmitted, as will be detailed below.

As indicated above, mode 2 can also apply in the case where the selection of data is done by a number of inputs— rather than a time interval—after the last acknowledged item of data.

Figure 2A:
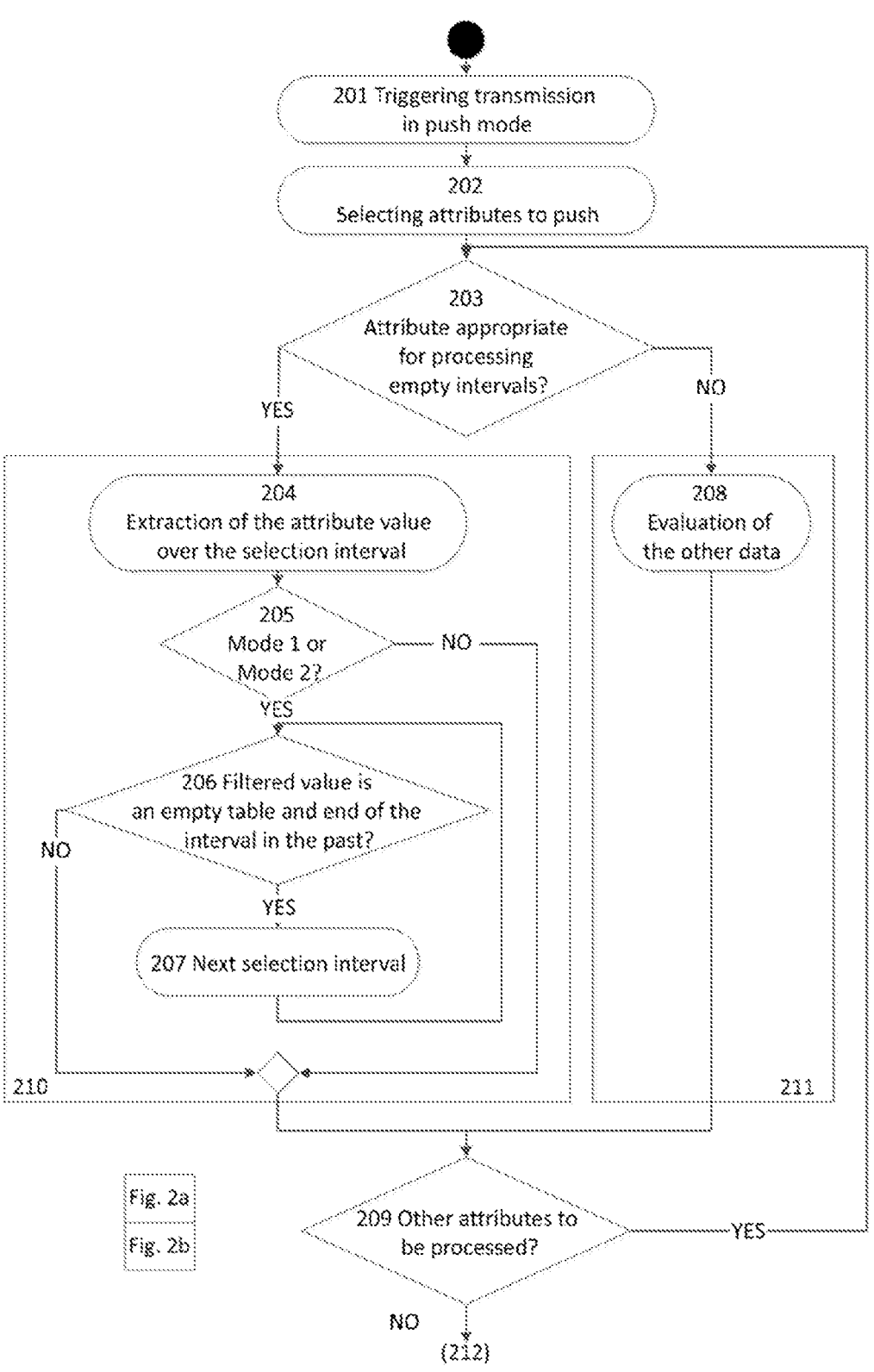
FIG. 2*a* is a first part of a flowchart of a push data method according to one or more embodiments.
Figure 2B:
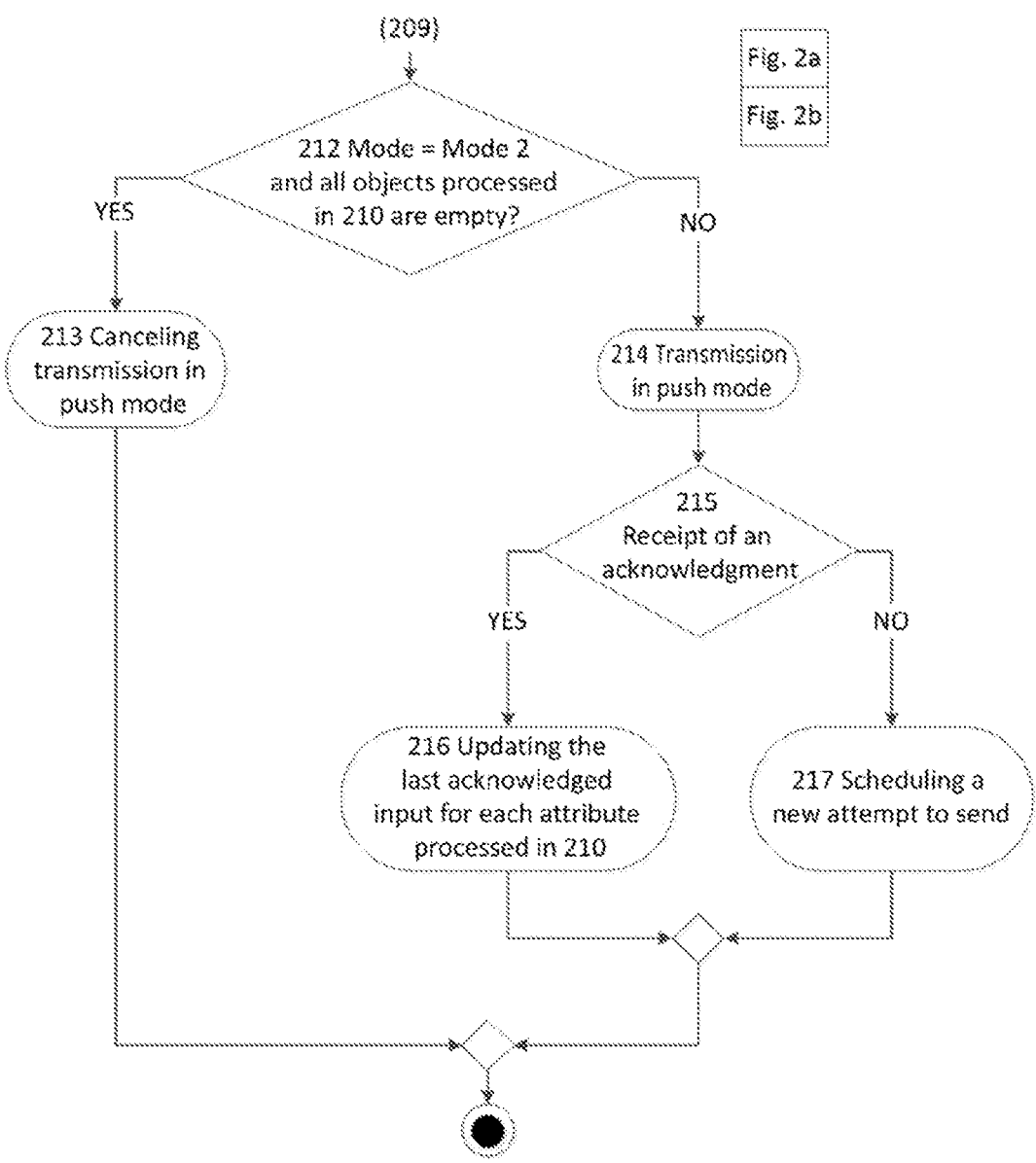
FIG. 2*b* is a second part of a flowchart of a push data method according to one or more embodiments.

FIGS. 2*a* and 2*b* combined form a flowchart of a method for pushing data according to one or more non-limiting exemplary embodiments and implementing the modes mentioned above.

In FIG. 2*a*, in 201, a data transmission in push mode is triggered. According to certain embodiments, this triggering is periodic, according to other embodiments, the triggering is not periodic; it is for example linked to a triggering event.

In 202, a selection of the attributes of the objects to be pushed is carried out. This selection is for example based on a predefined list, one or more selection criteria, etc. A first attribute among the attributes of objects selected during step 202 is then analyzed by 203 to determine whether it is likely to be processed for empty data selection intervals.

According to the present embodiment and as indicated above, this condition is fulfilled when the attribute contains ordered and selectable data over a specified depth after the last item of data acknowledged by the client. A processing of empty intervals is applied to these attributes in the left branch 210 of the flowchart.

The attributes that do not meet the test criterion in 203 are evaluated in 208, in the right branch 211. The other data contain, for example, non-time-logged data.

According to certain embodiments, the evaluation may comprise the decision to transmit or not to transmit the other data. Indeed, these data may be the accessory of the time-logged data processed in the branch 210, but there may be little sense to use bandwidth to transmit some other data in the absence of time-logged data.

The processing branch 210 and the output of the evaluation in 208 join in 209.

According to one or more exemplary embodiments, the processing of the empty intervals of attribute values to be transmitted is as follows: in the event of the presence of an attribute of an object likely to be processed, the content of this attribute over a first selection interval over a determined depth is analyzed to determine if it contains values to be transmitted (204). It is determined if the transmission should be done in push mode 1 or 2 (test in 205). If the transmission is not done in mode 1 or 2, then step 209 is reached.

Otherwise, it is determined in 206 if the selection is empty of values to be transmitted. If this is the case, the next selection interval is taken into consideration (207) and it is again determined if it is empty of values to be transmitted in 206. The 206/207 loop continues either until a selection interval contains values to be transmitted or until the end of the selection interval is no longer in the past. The output of the loop 206/207 leads to the test 209. In 209, it is evaluated if all attributes to be pushed have been taken into account— if not, the next attribute is selected and the processing resumes in 203.

In FIG. 2*b*, if all the attributes to be pushed have been taken into account, it is determined whether none of the attributes processed in the branch 210 contained attribute values to be transmitted. If this is the case and if the push mode is mode 2, then no transmission in push mode is performed (213) until the next triggering. In other cases, a transmission in push mode is carried out in 214, containing data to be sent coming from one of the two branches 210 or 211. If neither of the two branches provided data to be transmitted, an empty transmission is performed. In the event that acknowledgment is received from the client (positive test at 215), an update of the last acknowledged input is carried out for each of the attributes processed in branch 210 (216). If no acknowledgment is received, a new attempt is scheduled (217).

With reference to the DLMS standard, step 202 comprises for example the review of a list of attributes of objects that have to be pushed, this list being defined by an attribute called "push_object_list". Step 203 comprises for example the verification that an object comprises a data buffer corresponding to an interface class called a "generic profile" and with a selection of the data relating to the last input marked as acknowledged, the depth of the selection interval relating to the last acknowledged item of data being defined by an item of configuration data called "data_index" and defined by table 9 of the previously mentioned Blue Book.

In the foregoing, various advantages have been described. A specific embodiment may have only one or more of said advantages, but not necessarily all the advantages. Certain embodiments may have one or more advantages that are not described and/or do not have any of the advantages described.

APPENDIX

It is proposed to define an attribute characterizing the management of the push modes in the context of a method for transmission in push mode and which can have one of the following three values:

Mode 0=SKIP_DISABLED:

Default Mode. The method of skipping empty selection intervals is disabled.

Mode 1=SKIP_EMPTYSEND:

The method of skipping empty selection intervals is active according to mode 1.

Mode 2=SKIP_NOEMPTYSEND:

The method of skipping empty selection intervals is active according to mode 2.

In the context of DLMS:

A structure of ordered data with a selection from the last acknowledged item of data is for example a class 7 object buffer with a selection from the last acknowledged item of data. A DLMS/COSEM class 7 buffer is a buffer that fills with objects that are "captured" periodically or not, these objects being able to be accumulated by order of arrival or sorted as a function of an object (for example a timestamp).

REFERENCE SIGNS

100—Server device
101—Processor
102—Memory
103—Meter
104—Communication bus
105—User interface
106—Bidirectional communication interface
107—Display
108—Software code
109—Working memory
110—Client device
The invention claimed is:

1. A method for transmission in push mode, implemented by a transmitting device comprising a memory comprising software code and a processor which, when executing the software code, causes the device to implement the method, the method comprising:
   (a) triggering a transmission, to a receiving device, all or a subset of values of an attribute adapted to contain ordered data comprising said values, the transmission containing at most the values of a single selection interval of the ordered data;
   (b) verifying that the attribute has no value to be transmitted for all among the N adjacent data selection intervals from a selection starting point in the order of the data to the end of the interval preceding the interval comprising a current data collection period, with N being an integer equal or greater than two;
   (c) if the verification is positive, transmitting a single message indicative of the absence of values for the N intervals.

2. The method according to claim 1, if the verification is negative, the transmission in push mode, to the receiving device, of a message comprising the values of the first interval that is not empty of values to be transmitted, no message being transmitted for the intervals empty of values to be transmitted preceding said first interval.

3. The method according to claim 2, comprising, following the transmission of the message comprising values, the receipt of an acknowledgment from the receiving device and the updating of information identifying the last value acknowledged for the attribute.

4. The method according to claim 3, wherein the starting point in the order of the data is adjacent to the end of the interval comprising the most recent value acknowledged by the receiving device.

5. The method according claim 1, wherein the starting point in the order of the data is counted from the most recent value acknowledged by the receiving device.

6. The method according to claim 1, the verification step being preceded by a step of filtering the data of the attribute according to one or more criteria in order to determine said values to be transmitted.

7. The method according to claim 1, comprising
   verifying whether other attributes are to be processed;
   in the affirmative, step (b) is carried out for each other attribute to be processed, the verification for step (c) being considered positive in case of absence of values to transmit for all attributes processed.

8. The method according to claim 1, in which the single message indicative of the absence of values for the N intervals comprises an empty table.

9. The method according to claim 1, wherein the data are ordered from the oldest item of data to the most recent item of data.

10. The method according to claim 9, wherein the data comprise a timestamp, the order being a function of the timestamp.

11. The method according to claim 1, wherein the selection interval is either an interval defined by a number of values or an interval defined by a duration.

12. The method according to claim 1, wherein a time interval comprises one or more data collection periods, corresponding to a data selection depth.

13. A non-transitory storage medium readable by a device provided with a processor, said medium comprising instructions which, when the program is executed by a processor of a device, cause the device to carry out the method according to claim 1.

14. A communication device comprising a processor and a memory comprising software code, wherein the processor, when executing the software code, causes the communication device to carry out the method according to claim 1.

* * * * *